US007900446B2

(12) United States Patent
Geissler et al.

(10) Patent No.: US 7,900,446 B2
(45) Date of Patent: Mar. 8, 2011

(54) HYDROSTATIC DRIVE WITH ROTATIONAL SPEED LIMITATION

(75) Inventors: Grit Geissler, Dresden (DE); Reinhold Schniederjan, Neu-Ulm (DE); Karl-Heinz Vogl, Ummendorf (DE); Markus Gepraegs, Ulm (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 390 days.

(21) Appl. No.: 11/793,856

(22) PCT Filed: Dec. 14, 2005

(86) PCT No.: PCT/EP2005/013436
§ 371 (c)(1),
(2), (4) Date: Jun. 21, 2007

(87) PCT Pub. No.: WO2006/069631
PCT Pub. Date: Jul. 6, 2006

(65) Prior Publication Data
US 2008/0134674 A1 Jun. 12, 2008

(30) Foreign Application Priority Data
Dec. 23, 2004 (DE) .......................... 10 2004 062 388

(51) Int. Cl.
*F16D 31/02* (2006.01)

(52) U.S. Cl. ........................................................ 60/468
(58) Field of Classification Search ................... 60/464, 60/468
See application file for complete search history.

(56) References Cited

U.S. PATENT DOCUMENTS

| 3,996,743 | A | 12/1976 | Habiger et al. |
| 4,203,293 | A | 5/1980 | Bubula et al. |
| 4,548,036 | A * | 10/1985 | Matsuda et al. ................ 60/468 |
| 5,897,176 | A | 4/1999 | Dvorak et al. |
| 6,360,537 | B1 | 3/2002 | Widemann |

FOREIGN PATENT DOCUMENTS

| DE | 38 25 726 A1 | 2/1990 |
| DE | 102 41 950 A1 | 3/2004 |
| DE | 102 50 903 A1 | 5/2004 |
| JP | 2002-013636 | 1/2002 |

* cited by examiner

*Primary Examiner* — F. Daniel Lopez
(74) *Attorney, Agent, or Firm* — Scully, Scott, Murphy & Presser, P.C.

(57) ABSTRACT

The invention related to a hydrostatic drive comprising a hydraulic pump (3) which is driven by a drive machine (2) and pumps into at least one first working line (4), and a pressure line (18) in which a feed quantity dependent on the speed of the drive machine (2) flows. When a differential pressure value in the pressure line (18) is exceeded, the pressure means can be extracted from the first working line (4).

7 Claims, 2 Drawing Sheets

HYDROSTATIC DRIVE WITH ROTATIONAL SPEED LIMITATION

Figure 1:
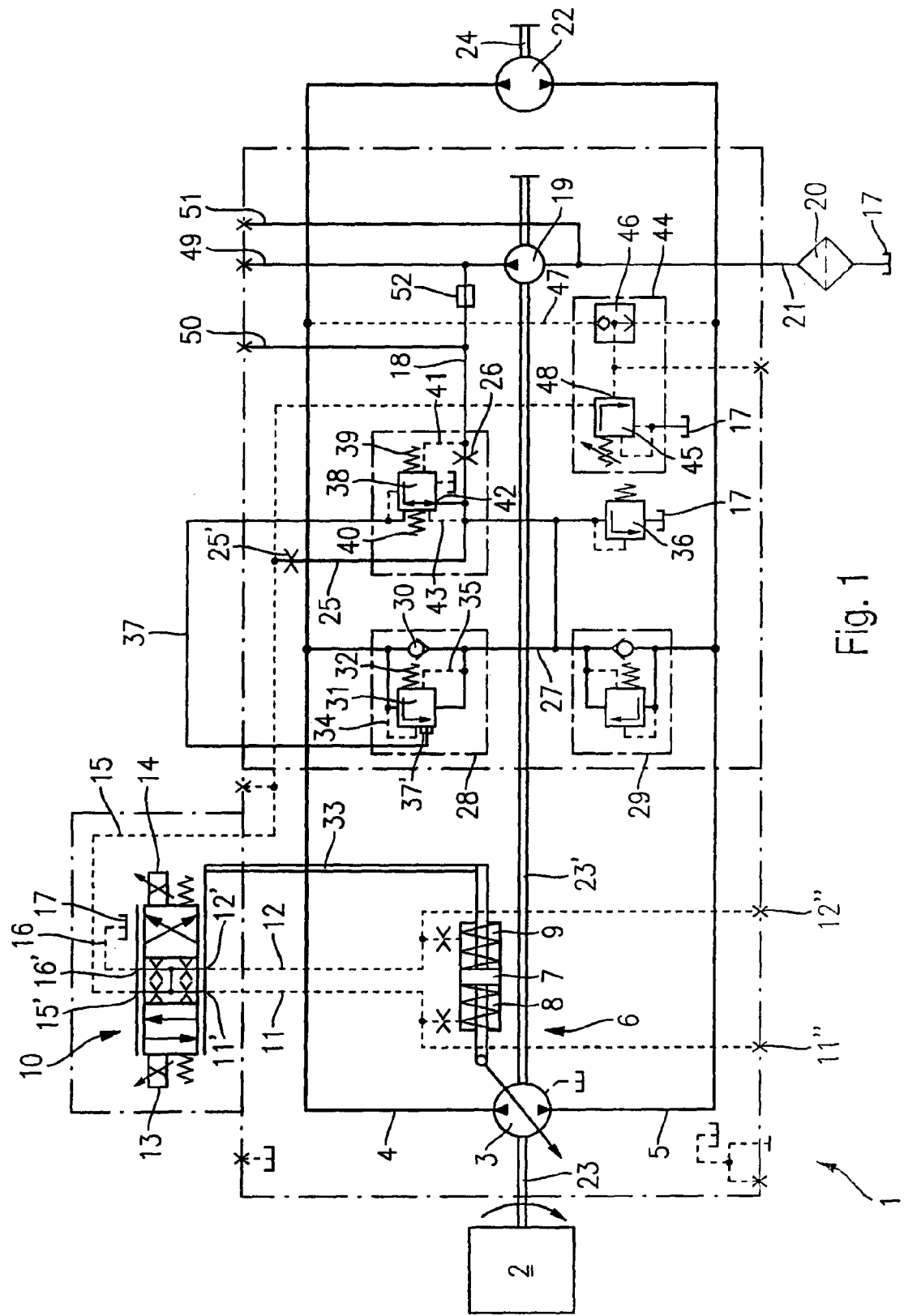

The invention relates to a hydrostatic drive.

In the case of hydrostatic drives such as those used, for example, in mobile driven machines, a hydraulic pump, disposed in a closed circuit, is usually driven by a driving machine. The hydraulic pump is usually connected to a hydraulic motor by two work lines. In certain travel situations, it may happen that the hydraulic motor delivers the pressure medium in the closed hydraulic circuit. In this case, the hydraulic pump operates as a motor, and is acted upon by the pressure medium delivered into it. If, in this case, the braking load of the drive motor is exceeded, said braking load corresponding to the respective rotational speed, there is an increase in the rotational speed of the driving machine. Appropriate measures must therefore be effected by the hydraulic drive in order to prevent an unacceptable increase in the rotational speed of the driving machine, which increase can result in the destruction of the driving machine.

Known from DE 102 41 950 A1 is the practice of providing a throttle valve in the work line disposed downstream from the hydraulic motor. By means of this valve, throttling of the volume flow in the work line can be realized. For this purpose, the throttle valve is influenced in respect of its position by an actuating piston. The position of the actuating piston depends, in turn, on the pressure of the work line disposed downstream from the throttle valve, and on a pressure that is dependent on the rotational speed of the drive motor.

In the case of the proposed drive, it is disadvantageous that the entire delivery volume has to be delivered through the throttle point. In this case, substantial temperatures are reached in the pressure medium. An additional disadvantage is that the control of the regulated throttle valve requires a substantial amount of resource. A further actuating valve is also required, in addition to the actuating cylinder.

The invention is based on the object of creating a hydrostatic drive, in which it is possible for the increase in the rotational speed of the driving machine to be limited using simple means.

The object is achieved by the hydrostatic drive according to the invention, having the features of Claim 1.

In the case of the hydrostatic drive according to the invention, use is made of the fact that a feed quantity, which is dependent on the rotational speed of the driving machine, flows in a pressure line, e.g. in a feed pressure line. A differential pressure value can therefore be defined for this feed quantity in the pressure line, pressure medium being removed from the work line if this differential pressure value is exceeded. As a result of the removal of pressure medium from the work line, only some of the pressure medium delivered into the work line by the hydraulic motor continues to be delivered back to the hydraulic pump. The flow of pressure medium through the hydraulic pump is thereby reduced, such that an unacceptable increase in the rotational speed of the driving machine is prevented. The hydrostatic drive has the advantage, in particular, that only the comparatively low pressure in the pressure line is used for control. As a result, the safety of the system is improved and the costs are reduced.

Advantageous developments of the hydrostatic drive according to the invention are stated in the sub-claims. In particular, it is advantageous to generate the rotational-speed-dependent pressure by means of a feed pump which, in turn, is driven jointly with the hydraulic pump via the driving machine. Since the feed pump is usually realized as a fixed-displacement pump, the feed quantity delivered by this pump corresponds in each case to a rotational speed of the drive motor.

In addition, to enable pressure medium to be removed from the work line, it is advantageous to use a high-pressure limiting valve, which is necessary in any case for the purpose of limiting the maximum allowable working pressure in the work line. For this purpose, the high-pressure limiting valve is opened, in dependence on the respective pressure prevailing in the work line, upon the limiting value being exceeded in the pressure line, such that pressure medium can be removed from the work line via the high-pressure limiting valve.

A hydrostatic drive that is protected against over-revving can be realized in a particularly simple manner in that the high-pressure limiting valve is activated directly from the pressure line, via a differential-pressure control valve. The differential-pressure control valve recognizes an increase in the feed quantity in the pressure line, and releases a connection which permits a through flow in the direction of the high-pressure limiting valve. The pressure in the pressure line thereupon acts upon a measuring surface of the high-pressure limiting valve, and opens the high-pressure limiting valve. As a result, a connection which permits a through flow, for example in the direction of the tank volume, is opened out of the work line.

Furthermore, it is particularly advantageous if the first work line is part of a closed hydraulic circuit in which the hydraulic pump is connected to a hydraulic motor via two work lines. In such a case, protection against excessive rotational speeds of the driving machine, both for forward travel and for reverse travel, can be realized in a simple manner. For this purpose, a high-pressure limiting valve is assigned to each of the two work lines, the two high-pressure limiting valves being opened either singly, then in dependence on the respective direction of travel or, alternatively, together, upon the pressure being exceeded in the pressure line.

Furthermore, it is advantageous if the two high-pressure limiting valves are, respectively, part of a feed-valve unit of the first work line and of a feed valve unit of the second work line, so as to produce a short-circuited hydraulic circuit through the opened high-pressure limiting valve of the one work line and through the feed valve unit of the other work line. In this way, two hydraulic circuits are realized, only one of which leads through the hydraulic pump. The thus divided flow of pressure medium does not then result in an unacceptable increase in rotational speed by the driving machine.

Figure 2:
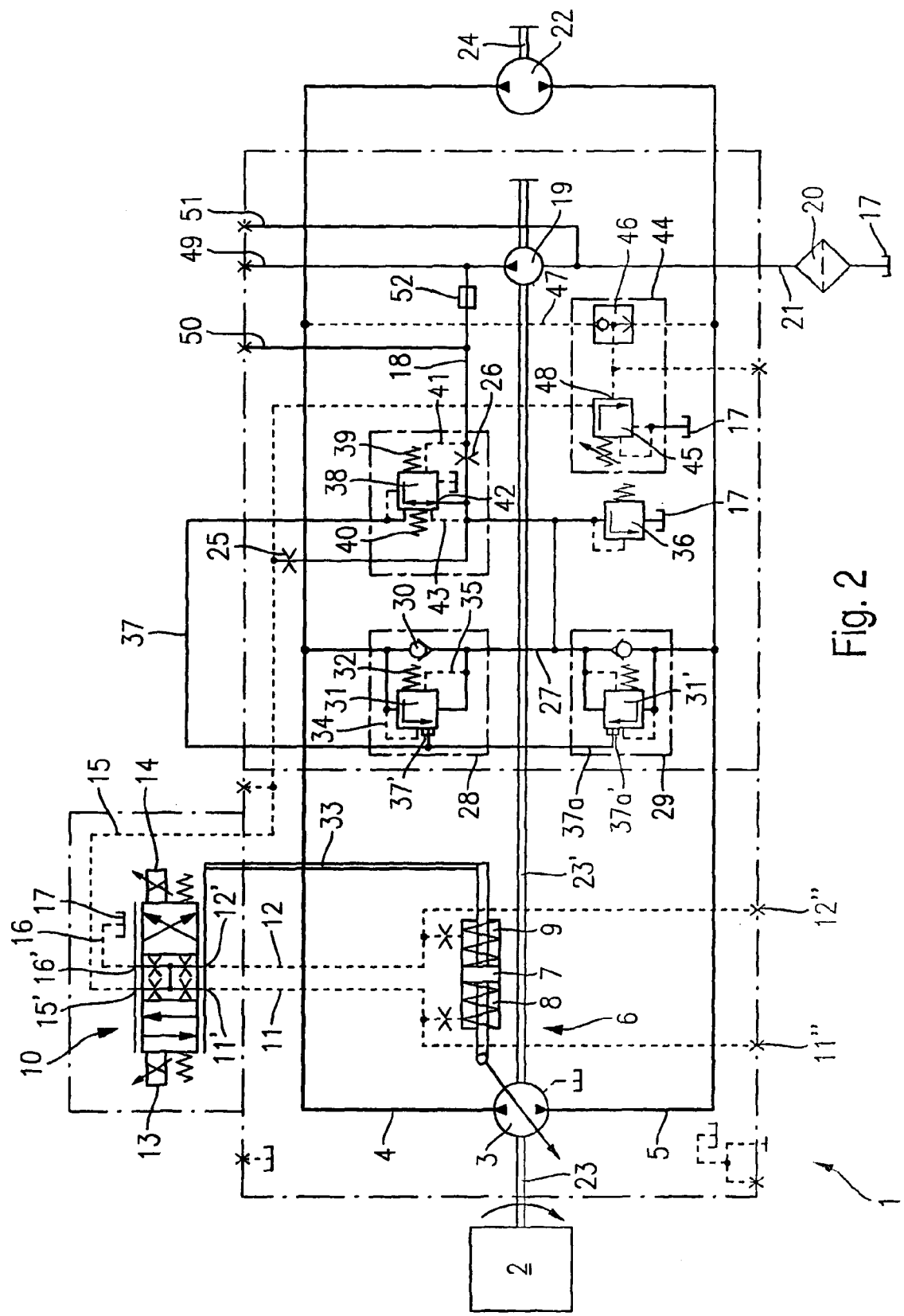

A preferred exemplary embodiment of the hydrostatic drive according to the invention is represented in the drawing and explained with reference to the following description. In the drawing:

FIG. 1 shows a first exemplary embodiment for a hydrostatic drive according to the invention, and FIG. 2 a second exemplary embodiment for a hydrostatic drive according to the invention.

FIG. 1 shows a first exemplary embodiment of a hydrostatic drive 1 according to the invention. The hydrostatic drive has a driving machine 2. The driving machine 2 is preferably a diesel motor. The driving machine 2 drives a hydraulic pump 3. The hydraulic pump 3 is preferably a hydrostatic axial piston machine capable of swivelling in two directions. For the purpose of driving the hydraulic pump 3, the hydraulic pump 3 is connected to the driving machine 2 via a drive shaft 23.

The hydraulic pump 3 is adjustable in respect of its delivery volume, and can deliver either into a first work line 4 or into a second work line 5. The pressure medium delivered by the hydraulic pump 3 drives a hydraulic motor 22, which drives the vehicle via a drive shaft 24. An adjusting device 6 is provided for the purpose of setting the hydraulic pump 3 in respect of delivery direction and delivery volume. The adjusting device 6 has an actuating cylinder, in which an actuating piston 7 is disposed. The actuating piston 7 divides the actuating cylinder into a first actuating pressure chamber 8 and a second actuating pressure chamber 9.

The actuating piston 7 is acted upon, with a hydraulic force, by the actuating pressure prevailing, respectively, in the first actuating pressure chamber 8 and the second actuating pressure chamber 9. In addition, a respective centring spring is disposed in the first actuating pressure chamber 8 and in the second actuating pressure chamber 9, which springs reset the actuating piston 7 to a central position in the case of a pressure equilibrium in the first actuating pressure chamber 8 and the second actuating pressure chamber 9. In this central position, the hydraulic pump 3, whose adjusting mechanism is coupled to the actuating piston 7, is set to a zero-delivery volume.

The pressure is set in the first actuating pressure chamber 8 and in the second actuating pressure chamber 9 by means of an actuating pressure control valve 10. By means of two connections 11', 12', the actuating pressure control valve 10 is connected to the first actuating pressure 8 via a first actuating pressure line 11, and to the second actuating pressure chamber 9 via a second actuating pressure line 12.

The actuating pressure control valve 10 is itself adjustable in respect of its position by means of a first solenoid 13 and a second solenoid 14. In FIG. 1, the actuating pressure control valve 10 is shown in its neutral position. In the neutral position of the actuating pressure control valve 10, both the first actuating pressure line 11 and the second actuating pressure line 12 are throttled, respectively, by an actuating pressure supply line 15 and a relief line 16.

The maximum possible actuating pressure is applied to an input 15' of the actuating pressure control valve 10 via the actuating pressure supply line 15. An output 16' of the actuating pressure control valve 10 is connected to a tank volume 17 via a relief line 16. From the previously described central position of the actuating pressure control valve 10, in which all four connections of the actuating pressure control valve 10 are interconnected in a throttled manner, the actuating pressure control valve 10 can be displaced out of its neutral position through the application of a control current to the first solenoid 13 or to the second solenoid 14. If, for example, current is applied to the first solenoid 13, the actuating pressure control valve 10 is displaced in the direction of its first end position.

In the first end position of the actuating pressure control valve 10, the actuating pressure supply line 15 is connected to the first actuating pressure line 11, such that the pressure prevailing in the actuating pressure supply line 15 acts upon the actuating piston 7 by means of the side of the latter which faces towards the first actuating pressure chamber 8. At the same time, the second actuating pressure line 12 is connected to the tank volume 17 via the relief line 16. Different actuating pressures are thereby produced in the first actuating pressure chamber 8 and the second actuating pressure chamber 9, as a result of which the actuating piston 7 is displaced to the right in FIG. 1.

Conversely, an actuating signal can also be applied to the second solenoid 14, such that the second solenoid 14 displaces the actuating pressure control valve 10 in the direction of its second end position. In the second end position of the actuating pressure control valve 14, the actuating pressure line 15 is connected to the second actuating pressure line 12, and the relief line 16 is connected to the first actuating pressure line 11. Accordingly, the second actuating pressure chamber 9 is now pressurized, whilst the first actuating pressure chamber 8 is relieved in the direction of the tank volume 17. The result is an actuating motion of the actuating piston 7 to the left in FIG. 1.

If no actuating signals are being applied to either the first solenoid 13 or the second solenoid 14, the actuating pressure control valve 10 is acted upon solely by the force of two centring springs, which reset the actuating pressure control valve 10 in the direction of its neutral position. In the neutral position, all four connections of the actuating pressure control valve 10 are again interconnected, such that the pressure in the first actuating pressure chamber 8 and the pressure in the second actuating pressure chamber 9 are equalized. The springs disposed in the actuating pressure chambers 8, 9 likewise bring the actuating piston 7 back into its central position. The actuating motion of the actuating piston 7 is fed back to the actuating pressure control valve 10 via a coupling rod 33.

In order to prevent an excessively rapid actuating motion of the actuating piston 7, respective throttles are disposed in the first actuating pressure line 11 and the second actuating pressure line 12, between the actuating pressure control valve 10 and the adjusting device 6. A respective actuating pressure measuring connection 11" and 12" is routed outwards from the actuating pressure lines 11, 12, in order to monitor the actuating pressures acting upon the actuating chambers 8 and 9, respectively.

By means of the two solenoids, 13, 14, the actuating pressure control valve 10 can be brought into any position located between the two end positions. A merely reduced actuating pressure can thus be supplied to the actuating pressure chambers 8 and 9 respectively. The pressure prevailing in the actuating pressure supply line 15 forms an upper limit for the adjustable actuating pressure. In order to apply a pressure to the actuating pressure supply line 15, the actuating pressure line 15 is connected to a feed pressure line 18. An actuating pressure throttle 25' is disposed in an actuating pressure line 25 which connects the feed pressure line 18 to the actuating pressure supply line 15.

A feed pump 19, which sucks pressure medium out of the tank volume 17 via a filter 20 and a suction line 21 and delivers it into the feed pressure line 18, is provided for the purpose of pressurizing the feed pressure line 18. The feed pump 19 in this case is preferably driven by the driving machine 2, via a drive shaft portion 23'. The feed pump 19 is provided to deliver in one direction only, and is preferably realized as a fixed-displacement pump. The feed quantity delivered by the feed pump 19 is thus directly dependent on the rotational speed of the driving machine 2.

As long as the hydraulic work circuit is without pressure from the two work lines 4, 5, the feed pump 19 delivers pressure medium into the work circuit. For this purpose, the feed pressure line 18 is connected, on the one hand, to the delivery side of the feed pump 19 and, on the other hand, to a first connecting line 27. The first connecting line 27 connects the first work line 4 to the second work line 5.

A first feed valve unit 28 is disposed between the first work line 4 and the opening of the feed pressure line 18 into the first connecting line 27. Likewise, a second feed valve unit 29 is disposed between the second work line 5 and the opening of the feed pressure line 18 into the first connecting line 27. The first feed valve unit 28 has a non-return valve 30 and a high-pressure limiting valve 31, which is disposed in parallel thereto. The non-return valve 30 is oriented in such a way that it opens towards the first work line 4. The feed pump 19 can thereby pressurize the first work line 4, via the feed pressure line 18 and the first connecting line 27, for as long as a higher pressure prevails in the feed pressure line 18 than in the first work line 4. If the pressure prevailing in the first work line 4 exceeds the pressure of the feed pressure line 18, however, the non-return valve 30 closes.

In order to prevent critical pressures from occurring in the first work line 4, the high-pressure limiting valve 31 opens at values above critical pressure values, such that pressure medium can flow away out of the first work line 4. For this purpose, a force is applied to the high-pressure limiting valve 31 by means of a first setting spring 32. In the opposite direction, the pressure of the first work line 4 acts, at a pressure measuring surface, upon the high-pressure limiting valve 31, said pressure being supplied to this pressure measuring surface via a first bypass line 34.

In the embodiment represented, the high-pressure limiting valve 31 is realized as a pressure limiting valve. The hydraulic force of the pressure prevailing in the connecting line 27 or in the feed pressure line 18 acts, in the same direction as the force of the first setting spring 32, upon a further pressure measuring surface of the high-pressure limiting valve 31. For this purpose, the connecting line 27 is connected to the further measuring surface of the high-pressure limiting valve 31 via a second bypass line 35.

The structure of the second feed valve unit 29 also corresponds to that of the first feed valve unit 28 described thus far. This means that, if the pressure in the first work line 4 rises above a critical value, the high-pressure limiting valve 31 of the first feed valve unit 28 opens, and thus relieves the first work line 4 in the direction of the feed pressure line 18. If the pressure in the second work line 5 is below the pressure level of the feed pressure line 18, the non-return valve of the second feed valve unit 29 opens, and the pressure medium that has been removed via the first feed valve unit 28 of the first work line 4 flows away into the second work 5, via the second feed valve unit 29. If, however, the second work line 5 also has a higher pressure than the feed pressure line 18, a feed pressure limiting valve 36 is provided in order to protect the feed pressure line 18.

The feed pressure limiting valve 36 is likewise a spring-loaded pressure limiting valve. The feed pressure prevailing in the feed pressure line 18 acts upon the feed pressure limiting valve 36, contrary to the force of the spring. If the feed pressure exceeds a critical value, for example 25 bar, the feed pressure limiting valve 36 is set in the direction of its open position. In its open position, the feed pressure limiting valve 36 connects the feed pressure line 18 to the tank volume 17.

If the first work line 4 is relieved by the first feed valve unit 28, or its high-pressure limiting valve 31, because of critical pressures, and the removed pressure medium is drawn away into the feed pressure line 18, an increase in pressure beyond a limiting value is prevented in the feed pressure line 18 in that an increase in pressure over, for example, 25 bar triggers the opening of the feed limiting valve 36. Accordingly, the pressure medium removed from the first working line 4 is relieved into the tank volume 17 via the connecting line 27 and the feed pressure line 18, and via the feed pressure limiting valve 36.

The high-pressure limiting valve 31 can also be brought into its open position in dependence on the pressure prevailing in the first work line 4 and in a third measuring line 37, in which position a connection that permits a through flow is possible from the first work line 4 in the direction of the feed pressure line 18. For this purpose, the high-pressure limiting valve 31 has a control pressure measuring surface 37', at which a hydraulic force, acting contrary to the force of the first setting spring 32, can be applied to the high-pressure limiting valve 31. For this purpose, a control pressure can be applied, via the third measuring line 37, to the control pressure measuring surface 37' of the high-pressure limiting valve 31. The output of a differential pressure control valve 38 is connected at the end of the third measuring line 37 which faces away from the high-pressure limiting valve 31.

A first spring 39 applies a force to the differential pressure valve 38, in the direction of the neutral position of the latter. In the opposite direction, the force of a second spring 40 acts upon the differential pressure valve 38. In the same direction as the force of the first spring 39, a hydraulic force acts upon a delivery pressure measuring surface in the direction of the neutral position of the differential pressure valve 38. The delivery pressure measuring surface is connected to the feed pressure line 18 via a delivery pressure measuring line 41. The pressure prevailing at the delivery-side output of the feed pump 19 acts via the delivery pressure measuring line 41. Downstream from the branch to the delivery pressure measuring line 41, a feed pressure throttle 26 is realized in the feed pressure line 18. Downstream from the feed pressure throttle 26, a feed pressure input 42 of the differential pressure valve 38 is connected to the feed pressure line 18. Likewise downstream from the feed pressure throttle 26, there branches off from the feed pressure line 18 a feed pressure measuring line 43 which, in the same direction as the second spring 40, applies the feed pressure prevailing in the feed pressure line 18, downstream from the feed pressure throttle 26, to the differential pressure valve 38, at a further measuring surface.

If the rotational speed of the driving machine 2, and thereby the rotational speed of the feed pump 19, decreases, the volume flow through the feed pressure throttle 26 also decreases. As a result, the pressures supplied to the respective measuring surfaces via the delivery pressure measuring line 41 and the feed pressure measuring line 43 are equalized at the differential pressure valve 38. The resultant hydraulic forces on the differential pressure valve 38 are dependent on the size of the measuring surface respectively subjected to force. Through appropriate selection of the surface ratios in relation to one another, it is thereby possible to set the feed quantity at which the differential pressure valve 38 opens.

The feed quantity produced by the feed pump 19 corresponds to a certain rotational speed of the driving machine 2, to which this feed pump 19 is mechanically coupled in a firm manner. If the thus defined differential pressure limiting value is reached, the differential pressure valve 38 is actuated and progressively connects the feed pressure input 42 to the third measuring line 37.

A hydraulic force, acting contrary to the force of the first setting spring 32, is thus applied to the high-pressure limiting valve 31 via the third measuring line 37. This means that the high-pressure limiting valve 31 is opened in dependence on the working pressure prevailing in the first work line 4 and in dependence on the pressure in the third measuring line 37, this pressure being dependent on rotational speed. The opening of the high-pressure limiting valve 31 then enables pressure medium to be removed from the first work line 4. The flow of pressure medium delivered into the first work line 4 by the hydraulic motor 22, operated as a pump in overrun mode, is thus divided into a first partial flow, which is forwarded in the direction of the hydraulic pump 3, and a second partial flow, which is drawn away via the high-pressure limiting valve 31. The volume flow drawn away via the high-pressure limiting valve 31 can flow away in the manner already described, via the non-return valve of the second feed valve unit 29, in the direction of the second work line 5, so as to produce a hydraulic short-circuit of the work lines 4 and 5 via the high-pressure limiting valve 31 and the second feed valve unit 29. The driving machine 2 then continues to be driven only by the lower torque, which reduces from the reduce pressure in the work line. The driving machine 2 is not over-revved.

As long as the rotational speeds of the driving machine 2 lie within a non-critical range and, accordingly, the feed quantity of the feed pump 19 does not produce at the feed pressure throttle 26 a differential pressure that is above the differential pressure limiting value, the differential pressure valve 38 remains inactive. The only function of the high-pressure limiting valve 31 in that case is to protect the first work line 4.

A pressure cutoff valve unit 44 is additionally provided, in order to swivel back a swivelled-out hydraulic pump 3 when a critical pressure is found in one of the work lines 4 or 5.

By means of the pressure cutoff valve unit 44, the actuating pressure supply line 15 can be connected to the tank volume 17, such that the actuating pressure supply line 15 is relieved in the direction of the tank volume 17. As a result, there is no further actuating pressure available in one of the actuating pressure chambers 8, 9, and both actuating pressure chambers 8 and 9 are at the same low pressure level. The actuating piston 7 is then centred by the compression springs, and the hydraulic pump 3 is displaced in the direction of a vanishing delivery volume.

For this purpose, the pressure cutoff valve unit 44 has a pressure cutoff valve 44, via which the actuating pressure supply line 15 can be connected to the tank volume 17. In its neutral position, the pressure cutoff valve 45 is held in a closed position by a settable compression spring, in which position there is no connection permitting a through flow between the actuating pressure supply line 15 and the tank volume 17. A work line pressure can be applied to the pressure cutoff valve 45, contrary to the force of the settable spring. The work line pressure is supplied to the pressure cutoff valve 45 via a shuttle valve 46. The shuttle valve 46 connects to the respective measuring connection of the pressure cutoff valve 45 that work line 4 or 5, respectively, in which there prevails the higher pressure. For this purpose, the shuttle valve 46 is disposed in a second connecting line 47. The output of the shuttle valve 46 is connected to the measuring connection of the pressure cutoff valve 45.

A filter input line 49 is provided in case the filter 20 disposed in the suction line 21 is insufficient. Pressure medium is supplied to the filter input line 49 through the feed pump 19, it being possible to connect to the filter input line 49 a further filter, whose output is connected to the filter output line 50. In order that, in the case of an additional filter, the pressure medium delivered by the feed pump 19 also actually flows through said additional filter, a plug 52 is provided in the feed pressure line 18. As a further safeguarding possibility in the event of a blocked additional filter, a pressure relief line 51 is provided, which can be connected to the additional filter, on the input side of the latter, if the pressure gradient across the filter exceeds a critical value. The pressure relief line 51 is connected to the intake side of the feed pump 19.

The exemplary embodiment represented in FIG. 2 differs from the exemplary embodiment of FIG. 1 in that, not only does the first feed valve unit 28 have a high-pressure limiting valve 31, which can be activated in dependence on the pressure prevailing in the first work line 4, but the second feed valve unit 29 also has a corresponding high-pressure limiting valve 31'. The corresponding high-pressure limiting valve 31', likewise, can be opened in dependence on the pressure prevailing in the second work line 5, such that removal of pressure medium from the second work pressure line 5 can be effected.

The second feed valve unit 29 is thus identical in structure to the first feed valve unit 28. A pressure is supplied, via the third measuring line 37, in dependence on the rotational speed of the driving machine 2, both to the high-pressure limiting valve 31 and to the corresponding high-pressure limiting valve 31' of the second feed valve unit. The pressure is supplied, via a portion 37a of the third pressure measuring line 37, to a control pressure measuring surface 37a' of the corresponding high-pressure limiting valve 31' of the second feed valve unit 29. For this purpose, the portion 37a of the third measuring line 37 leads from a connection at the high-pressure limiting valve 31 to the corresponding control pressure measuring surface 37a' of the corresponding high-pressure limiting valve 31'. Unlike the exemplary embodiment of FIG. 1, the driving machine 2 is thus protected for both directions of travel.

Simultaneous activation of the high-pressure limiting valve 31 and of the corresponding high-pressure limiting valve 31' of the second feed valve unit 29 is sufficient to protect the driving machine 2 against the occurrence of excessively high rotational speeds. Since, in each case, pressure medium is removed, via either the first feed valve unit 28 or the second feed valve unit 29 from, respectively, the work line 4 or 5 downstream from the hydraulic motor 22, it is always ensured that the volume flow is divided into a through the hydraulic pump 3 and a removed portion. For the purpose of protecting the driving machine 2 against excessive rotational speed, it is therefore irrelevant whether the respectively other feed valve unit is likewise open.

If, on the other hand, only the high-pressure limiting valve 31 or 31' that is assigned to the work line located downstream from the hydraulic motor 22 is to be opened in dependence on the direction of travel in each case, a valve may be provided by which the pressure prevailing in the third measuring line 37 is supplied either to the high-pressure limiting valve 31 or to the corresponding high-pressure limiting valve 31'. This valve is, for example, a 3/2-way valve, which is adjusted between the two operating positions in dependence on the direction of travel and/or in dependence on the pressure gradient between the two work lines 4 and 5.

The invention is not limited to the exemplary embodiments represented. Rather, it is possible for all features of the exemplary embodiments to be combined with one another.

Instead of the removal of pressure medium by means of high-pressure limiting valves, as described in the exemplary embodiments, the removal of the pressure medium from the working line 4 or 5 may also be effected by means of a throttle valve or a flow regulator. The flow controller or throttle valve are then connected accordingly to the third measuring line 37, for the purpose of activation.

The invention claimed is:

1. A hydrostatic drive comprising a hydraulic pump connected to a hydraulic motor by a first work line, such that when the pump is driven by a driving machine, the pump delivers pressure medium into the first line, and such that when the hydraulic motor operates as a pump, in an overrun mode, the hydraulic motor delivers pressure medium into the first work line;
   a feed quantity of fluid flows into a feed pressure line, dependent on a rotational speed of the driving machine;
   wherein, when in the overrun mode and when a differential pressure limiting value in the feed pressure line is exceeded, a first partial flow of the pressure medium in the first work line is removed, so as to not flow to a hydraulic pump and a second partial flow is forwarded to the hydraulic pump.

2. A hydrostatic drive according to claim 1 and further comprising a first high-pressure limiting valve, which protects the first work line against excessive working pressure, opens to remove the first partial flow.

3. A hydrostatic drive according to claim 2 and further comprising a differential pressure valve which selectively connects the high-pressure limiting valve to the feed pressure line, to open the high-pressure limiting valve.

4. A hydrostatic drive according to claim 2 and further comprising the hydraulic pump being connected to the hydraulic motor, by a second work line.

5. A hydrostatic drive according to claim 4 and further comprising a second high-pressure limiting valve protecting the second work line from excessive pressure.

6. A hydrostatic drive according to claim 5 and further comprising wherein, when the differential pressure limiting valve in the feed pressure line is exceeded, both the first high-pressure limiting valve and the second high-pressure limiting valve are opened.

7. A hydrostatic drive according to claim 1 and further comprising a feed pump driven by the driving machine, for generating the feed quantity in the feed pressure line.

* * * * *